United States Patent
LaRoche et al.

(10) Patent No.: US 10,343,690 B2
(45) Date of Patent: Jul. 9, 2019

(54) INPUT TORQUE CONTROL DURING TRANSMISSION SHIFT

(71) Applicant: Ford Global Technologies, LLC, Dearborn, MI (US)

(72) Inventors: Cory Benson LaRoche, Wixom, MI (US); Bradley Dean Riedle, Northville, MI (US); Jianping Zhang, Ann Arbor, MI (US); Kendrick Morrison, Wayne, MI (US); Kenneth Edward Sovel, Commerce Twp., MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 15/791,729

(22) Filed: Oct. 24, 2017

(65) Prior Publication Data

US 2018/0118217 A1 May 3, 2018

Related U.S. Application Data

(60) Provisional application No. 62/414,506, filed on Oct. 28, 2016.

(51) Int. Cl.
*B60W 10/06* (2006.01)
*B60W 30/19* (2012.01)
(Continued)

(52) U.S. Cl.
CPC ............ *B60W 30/19* (2013.01); *B60W 10/06* (2013.01); *B60W 10/115* (2013.01);
(Continued)

(58) Field of Classification Search
CPC ............ Y10T 477/675; Y10T 477/677; B60W 30/19; B60W 10/115; B60W 10/06;
(Continued)

(56) References Cited

U.S. PATENT DOCUMENTS 6,991,584 B2 * 1/2006 Cowan .................. B60W 30/18
477/110
7,107,135 B2 9/2006 Soliman
(Continued)

FOREIGN PATENT DOCUMENTS

JP 3446437 B2 * 9/2003

OTHER PUBLICATIONS

English Translation of JP3446437B2; http://translationportal.epo.org; Dec. 12, 2018 (Year: 2018).*

*Primary Examiner* — Roger L Pang
(74) *Attorney, Agent, or Firm* — David Kelley; Brooks Kushman P.C.

(57) ABSTRACT

A controller commands an engine torque level in response to a driver demanded torque based on an accelerator pedal position. If the driver demanded torque decreases rapidly during or just prior to a torque phase of a shift, the controller commands the engine to temporarily generate torque exceeding the driver demand. The controller sets a nominal engine torque equal to the driver demand torque before the rapid decrease, slowly decreases the nominal engine torque during the torque phase, and decreases the nominal torque at progressively faster rates during the inertia phase to bring the nominal torque back into agreement with the driver demanded torque. The commanded engine torque is based on the nominal torque, but may be less than the nominal torque during the inertia phase to permit the engine speed to decrease faster.

13 Claims, 6 Drawing Sheets

(51) Int. Cl.
  *B60W 10/115*    (2012.01)
  *F16H 61/04*     (2006.01)
  *F16H 3/66*      (2006.01)

(52) U.S. Cl.
  CPC . *F16H 61/0437* (2013.01); *B60W 2510/1095* (2013.01); *B60W 2540/10* (2013.01); *B60W 2710/027* (2013.01); *B60W 2710/0666* (2013.01); *B60W 2710/0672* (2013.01); *B60W 2710/1005* (2013.01); *F16H 3/66* (2013.01); *F16H 2200/0069* (2013.01); *F16H 2200/2012* (2013.01); *F16H 2200/2046* (2013.01); *Y10T 477/675* (2015.01); *Y10T 477/677* (2015.01)

(58) Field of Classification Search
  CPC ... B60W 2710/0666; B60W 2710/027; B60W 2710/0672; B60W 2540/10
  See application file for complete search history.

(56) References Cited

U.S. PATENT DOCUMENTS

| | | | | |
|---|---|---|---|---|
| 7,351,183 B2* | 4/2008 | Fujii | ............... | F16H 61/061 477/109 |
| 7,727,113 B2* | 6/2010 | Tokura | ............... | B60W 10/06 477/107 |
| 7,731,628 B2* | 6/2010 | Asami | ............... | B60W 10/06 477/107 |
| 9,162,680 B1* | 10/2015 | Tseng | ............... | B60W 30/19 |
| 9,416,869 B2 | 8/2016 | Atmaram et al. | | |

* cited by examiner

INPUT TORQUE CONTROL DURING TRANSMISSION SHIFT

CROSS-REFERENCE TO RELATED APPLICATIONS

This application claims the benefit of U.S. provisional application Ser. No. 62/414,506 filed Oct. 28, 2016, the disclosure of which is hereby incorporated in its entirety by reference herein.

TECHNICAL FIELD

This disclosure relates to the field of control systems for automatic transmissions for motor vehicles. Specifically, the disclosure relates to control of the input torque during a shift to improve shift quality.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

SUMMARY OF THE DISCLOSURE

Figure 1:
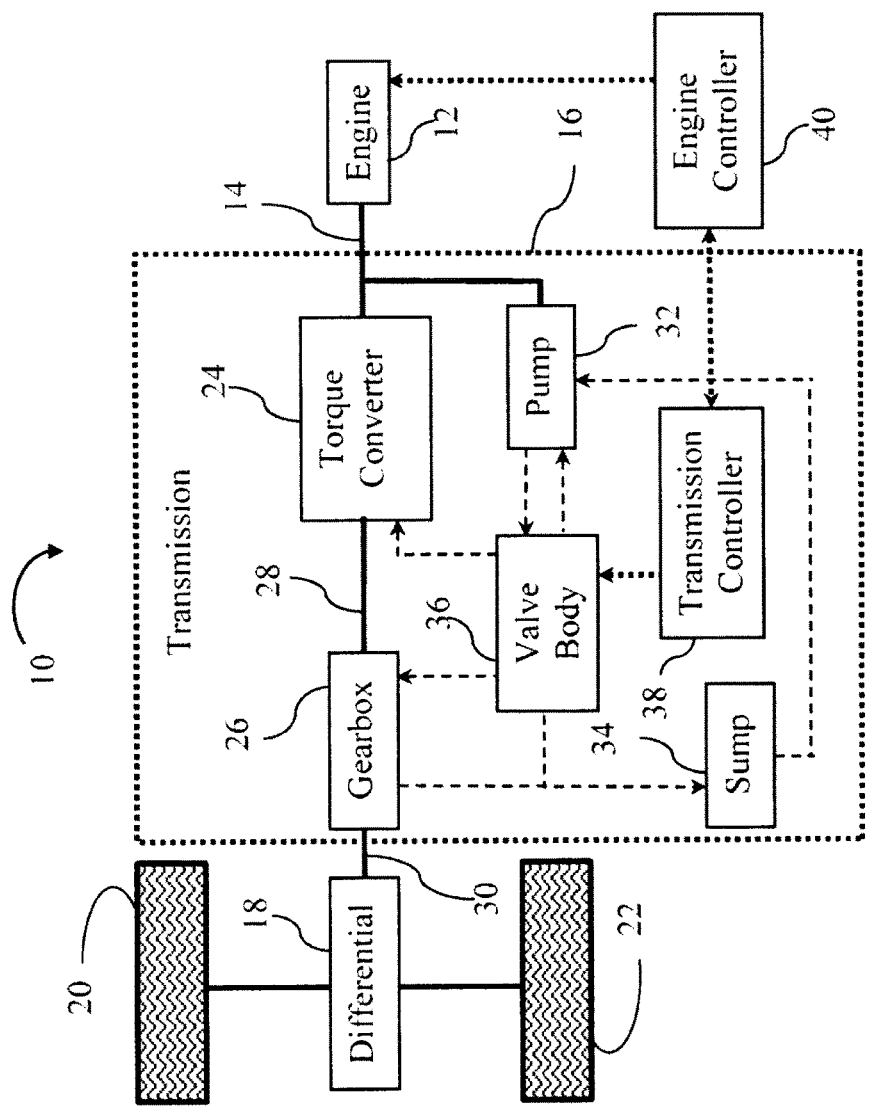
FIG. 1 is a schematic diagram of a vehicle powertrain.

A powertrain includes an engine, a transmission, and a controller. The transmission has a plurality of clutches engageable in various combinations to establish varying power flow paths. The controller is programmed to maintain an engine torque greater than a driver demanded torque in response to a reduction in driver demanded torque during a torque phase of a shift of the transmission. The controller may be further programmed to reduce the engine torque at a first rate during a remainder of the torque phase and an initial portion of an inertia phase and then reduce the engine torque at a second rate faster than the first rate during a second portion of the inertia phase, then reduce the engine torque at a third rate faster than the second rate during a final portion of the inertia phase.

A powertrain includes and engine, a transmission, and a controller. The transmission has a plurality of clutches engageable in various combinations to establish varying power flow paths. The controller is programmed to (i) maintain a nominal torque level above a driver demanded torque in response to a reduction in the driver demanded torque during a torque phase of a shift, and (ii) command the engine to deliver a torque equal to the nominal torque level during the torque phase. The controller may be further programmed to reduce the nominal torque level at a first rate during a remainder of the torque phase and an initial portion of an inertia phase, reduce the nominal torque level at a second rate faster than the first rate during a second portion of the inertia phase, and reduce the nominal torque level at a third rate faster than the second rate during a final portion of the inertia phase. The controller may be further programmed to command the engine to deliver a torque less than the nominal torque level during a portion of the inertia phase and equal to the nominal torque level during a remainder of the inertia phase. The controller may be further programmed to command clutch apply pressures based on the nominal torque level throughout the shift.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIG. 1 schematically illustrates a vehicle powertrain 10. Bold solid lines represent mechanical power flow connections. Thin dashed lines represent the flow of hydraulic fluid. Dotted lines represent the flow of information signals. Power is supplied by internal combustion engine 12 to crankshaft 14. Transmission 16 adjusts the torque and speed to suit vehicle needs and delivers the power to differential 18. Differential 18 transmits the power to left and right rear wheels 20 and 22, permitting slight speed differences as the vehicle turns a corner.

Transmission 16 includes a torque converter 24 and a gearbox 26. Torque converter 24 transmits torque hydrodynamically based on a speed difference between an impeller which is driven by crankshaft 14 and a turbine which drives gearbox input shaft 28 (sometimes called turbine shaft). Power is transmitted from the impeller to the turbine via moving fluid whenever the impeller rotates faster than the turbine. Torque converter 24 may include a stator which redirects the fluid when the impeller is rotating substantially faster than the impeller such that the turbine torque is a multiple of the impeller torque. Gearbox 26 includes gearing and shift elements configured to establish various power flow paths between shaft 28 and output shaft 30. Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The shift elements within gearbox 26 are engaged by supplying hydraulic fluid at an elevated pressure to a clutch apply chamber. Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 32, driven by crankshaft 14, draws fluid from sump 34 and delivers it at an elevated pressure to valve body 36. Valve body 36 delivers the fluid to the clutch apply chambers at a pressure controlled in accordance with signals from transmission controller 38. In addition to the fluid provided to clutch apply chambers, valve body provides fluid for lubrication and provides fluid to torque converter 24. The fluid eventually drains from gearbox 26 back to sump 34 at ambient pressure.

Engine controller 40 adjusts various actuators in the engine 12 to control the level of torque delivered at the crankshaft. For example, the controller may adjust a throttle opening, fuel injection quantity and timing, spank timing, etc. The engine controller determines the desired level of torque predominantly based on driver input via an accelerator pedal. Engine controller is in communication with transmission controller 38 and may adjust the torque output based on requests from the transmission controller. Engine controller 40 and transmission controller 38 may be separate microprocessors communicating via a controller area network or their various functions may be combined into a single microprocessor or split among more than two microprocessors.

Figure 2:
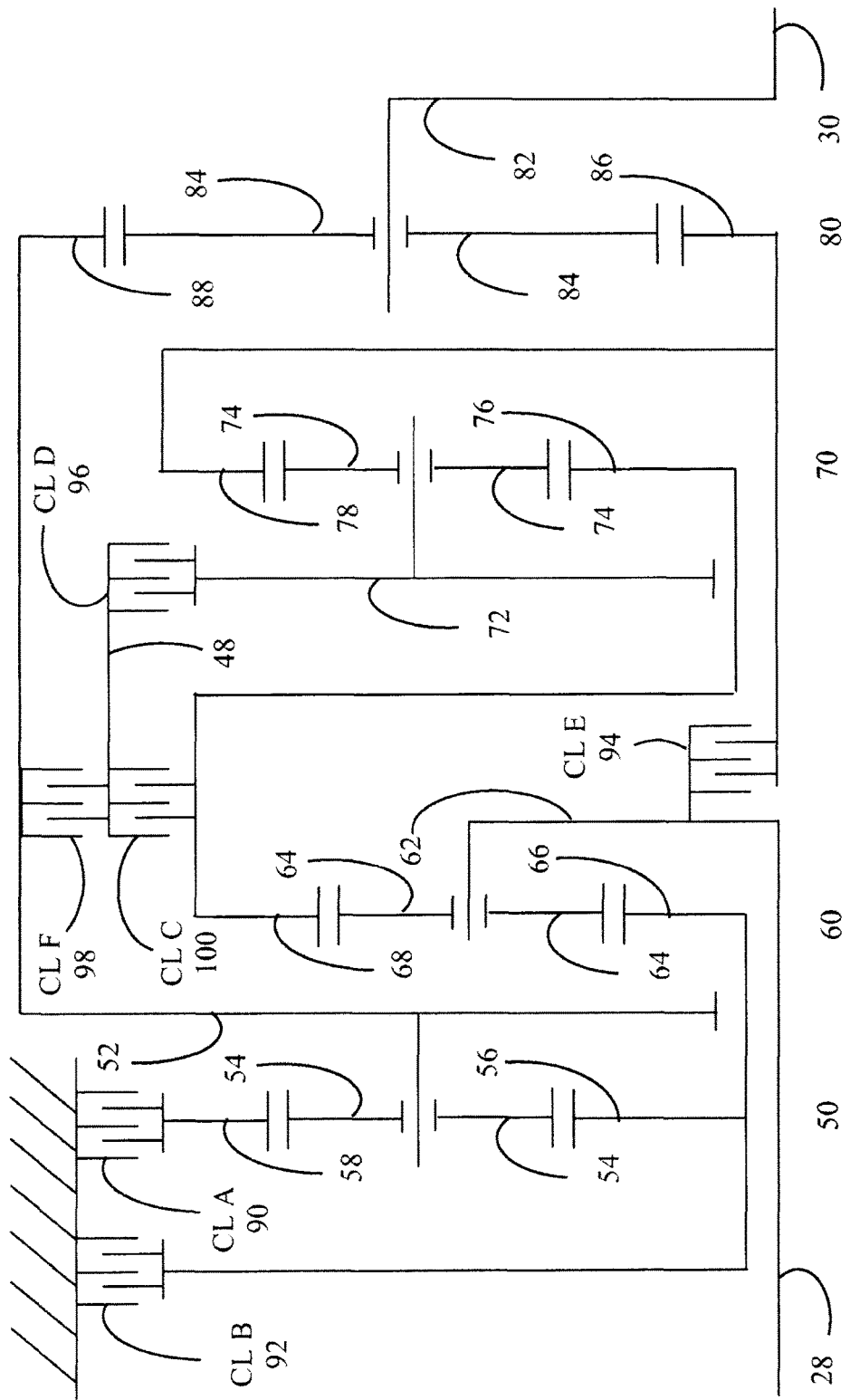
FIG. 2 is a schematic diagram of a transmission gearing arrangement suitable for the gearbox of the transmission system of FIG. 1.

An example transmission is schematically illustrated in FIG. 2. The transmission utilizes four simple planetary gear sets 50, 60, 70, and 80. Sun gear 56 is fixedly coupled to sun gear 66, carrier 52 is fixedly couple to ring gear 88, ring gear 68 is fixedly coupled to sun gear 76, ring gear 78 is fixedly coupled to sun gear 86, turbine shaft 28 is fixedly coupled to carrier 62, and output shaft 30 is fixedly coupled to carrier 82. Ring gear 58 is selectively held against rotation by brake 90 and sun gears 56 and 66 are selectively held against rotation by brake 92. Turbine shaft 28 is selectively coupled to ring gear 78 and sun gear 86 by clutch 94. Intermediate shaft 48 is selectively coupled to carrier 72 by clutch 96, selectively coupled to carrier 52 and ring gear 88 by clutch 98, and selectively coupled to ring gear 68 and sun gear 76 by clutch 100. A suggested ratio of gear teeth for each planetary gear set is listed in Table 1.

TABLE 1

| | |
|---|---|
| Ring 58/Sun 56 | 2.20 |
| Ring 68/Sun 66 | 1.75 |
| Ring 78/Sun 76 | 1.60 |
| Ring 88/Sun 86 | 3.70 |

As shown in Table 2, engaging the clutches and brakes in combinations of four establishes ten forward speed ratios and one reverse speed ratio between turbine shaft 28 and output shaft 30. An X indicates that the clutch is required to establish the speed ratio. An (X) indicates the clutch can be applied but is not required to establish the power flow path. In $1^{st}$ gear, either clutch 98 or clutch 100 can be applied instead of applying clutch 96 without changing the speed ratio. When the gear sets have tooth numbers as indicated in Table 1, the speed ratios have the values indicated in Table 2.

TABLE 2

| | A 90 | B 92 | C 100 | D 96 | E 94 | F 98 | Ratio | Step |
|---|---|---|---|---|---|---|---|---|
| Rev | X | X | | X | | X | −4.79 | 102% |
| $1^{st}$ | X | X | | (X) | X | | 4.70 | |
| $2^{nd}$ | X | X | X | X | | | 2.99 | 1.57 |
| $3^{rd}$ | X | | X | X | X | | 2.18 | 1.37 |
| $4^{th}$ | X | | X | X | | X | 1.80 | 1.21 |
| $5^{th}$ | X | | X | | X | X | 1.54 | 1.17 |
| $6^{th}$ | X | | | X | X | X | 1.29 | 1.19 |
| $7^{th}$ | | | X | X | X | X | 1.00 | 1.29 |
| $8^{th}$ | | X | | X | X | X | 0.85 | 1.17 |
| $9^{th}$ | | X | X | | X | X | 0.69 | 1.24 |
| $10^{th}$ | | X | X | X | | X | 0.64 | 1.08 |

Figure 3:
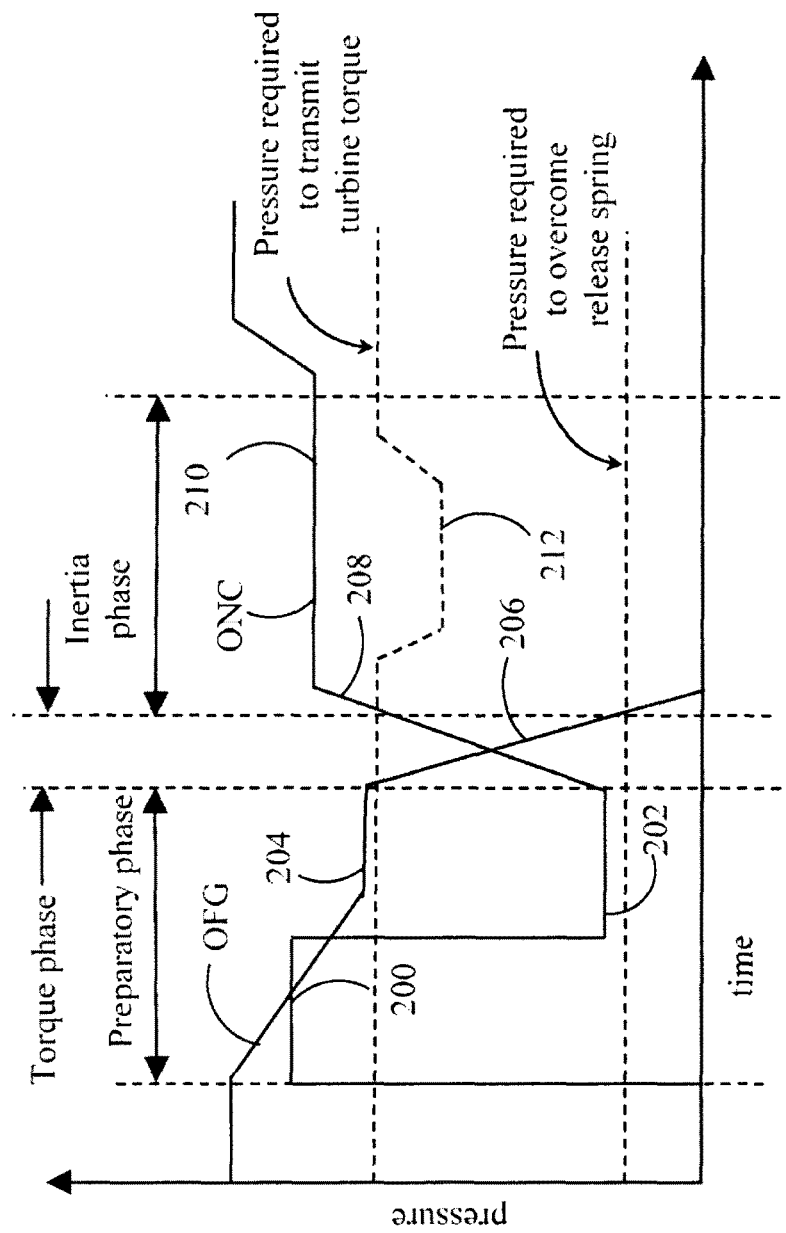
FIG. 3 is a graph illustrating an upshift at constant input torque.

FIG. 3 illustrates the pressure profile of an off-going clutch and an oncoming clutch during an upshift at constant accelerator pedal position. The shift proceeds in three phases: a preparatory phase, a torque transfer phase, and an inertia phase. During the preparatory phase, the oncoming clutch is stroked and the off-going clutch is set to incipient slip. Stroking the oncoming clutch involves commanding pressure so that fluid fills the apply chamber forcing the piston into contact with the clutch pack without squeezing the clutch pack to transfer torque. To accomplish this, the pressure is commanded to a high level at 200 for long enough to move the piston most of the way to the stroked position. Then, at 202, the pressure is held just slightly higher than necessary to overcome the return spring force to move the piston the rest of the way. Simultaneously, pressure to the off-going clutch is ramped down and held at the level required to transmit the current level of input torque at 204, such that any significant further reduction would cause it to start slipping. The controller uses a transfer function for each clutch that relates the commanded pressure to the clutch torque capacity. The ratio of clutch torque to input torque is determined by which power flow path is active. The power flow path does not change during the preparatory phase and ratio of the element speeds corresponds to the initial gear ratio.

During the torque transfer phase, the power flow path is switched to that of the upshifted gear ratio. However, the element speed ratios do not change substantially. The pressure to the off-going clutch is gradually reduced at 206 while the pressure to the oncoming clutch is gradually increased at 208. The torque phase ends when the torque capacity of the off-going clutch reaches zero and the torque capacity of the oncoming clutch is sufficient to transmit the current level of input torque, which should happen at the same time. The pressure to the off-going clutch is then further reduced to zero so that the return spring can push the piston away from the clutch pack. During the torque phase, the ratio of output torque to input torque gradually changes from the initial ratio to the upshifted ratio.

During the inertia phase, the speed ratios of the elements gradually change to the ratios associated with the upshifted ratio. Since elements have inertia, it takes time for this to occur. The oncoming clutch continues to ramp up to a level somewhat higher than required to transmit the current driver demanded torque and is then held near that level at 210. This has the effect of applying extra resistance to the turbine shaft which reduces the turbine speed, overcoming the inertia of the turbine, the engine, and other components that rotate with these components. During the inertia phase, engine torque may be reduced as shown at 212 to reduce the duration of the inertia phase. The inertia phase ends when all slip across the oncoming clutch is eliminated. At that point, the ratios of elements speeds are equal to the values associated with the upshifted gear ratio. After the inertia phase completes, the pressure to the oncoming clutch may be ramped up further to provide additional torque capacity margin. Conventionally, with the exception of the torque reduction at 212, the engine torque tracks the driver demanded torque.

In most transmissions, the rotational inertia on the input of the gearbox is considerably higher than the rotational inertia of internal components. When the internal components have negligible inertia, the output torque during the inertia phase is determined by the torque capacity of the oncoming clutch. Changes in input torque during the inertia phase impact the rate of change of the element speeds, but have negligible impact on the output torque. Vehicle occupants are sensitive to output torque disturbances and are likely to complain about shift quality if output torque changes are not smooth.

In at least one embodiment of the transmission of FIG. 2, clutch housings for clutches 96, 98, and 100 are all fixed for rotation with intermediate shaft 48. This single component has a relatively large rotational moment of inertia which can impact the shift characteristics. Consider an upshift from $3^{rd}$ gear to $4^{th}$ gear. Throughout this shift, clutches 90, 96, and 100 are fully engaged. Engagement of clutches 96 and 100 cause ring gear 68, sun gear 76, carrier 72, ring gear 78, and sun gear 86 all to rotate as a unit. The rotational inertia of this unit includes the large inertia of the triple clutch module. At the start of the shift, this unit rotates at 2.18 times the speed of output shaft 30 (equal to the speed of turbine shaft 28). At the end of the shift, this unit rotates at the same speed the output.

During the inertia phase, this large inertia provides a reaction force allowing changes in input torque to be transmitted to the output. An increase in torque on carrier 62 will be reacted by the inertia at ring 68 to transmit the torque change to sun gear 66, which transmits it to sun gear 56. Brake 90 acting on ring gear 58 provides a reaction to transmit torque from sun gear 56 to carrier 52, which transmits it to ring gear 88. The large inertia also provides a reaction at sun gear 86 to transmit torque from ring gear 88 to carrier 82 and output shaft 30. The inventors have determined that rapid torque reductions during an upshift are problematic. Furthermore, the inventors have determined that rapid torque reductions are more problematic at particular phases of shift progression than at other phases.

Figure 4:
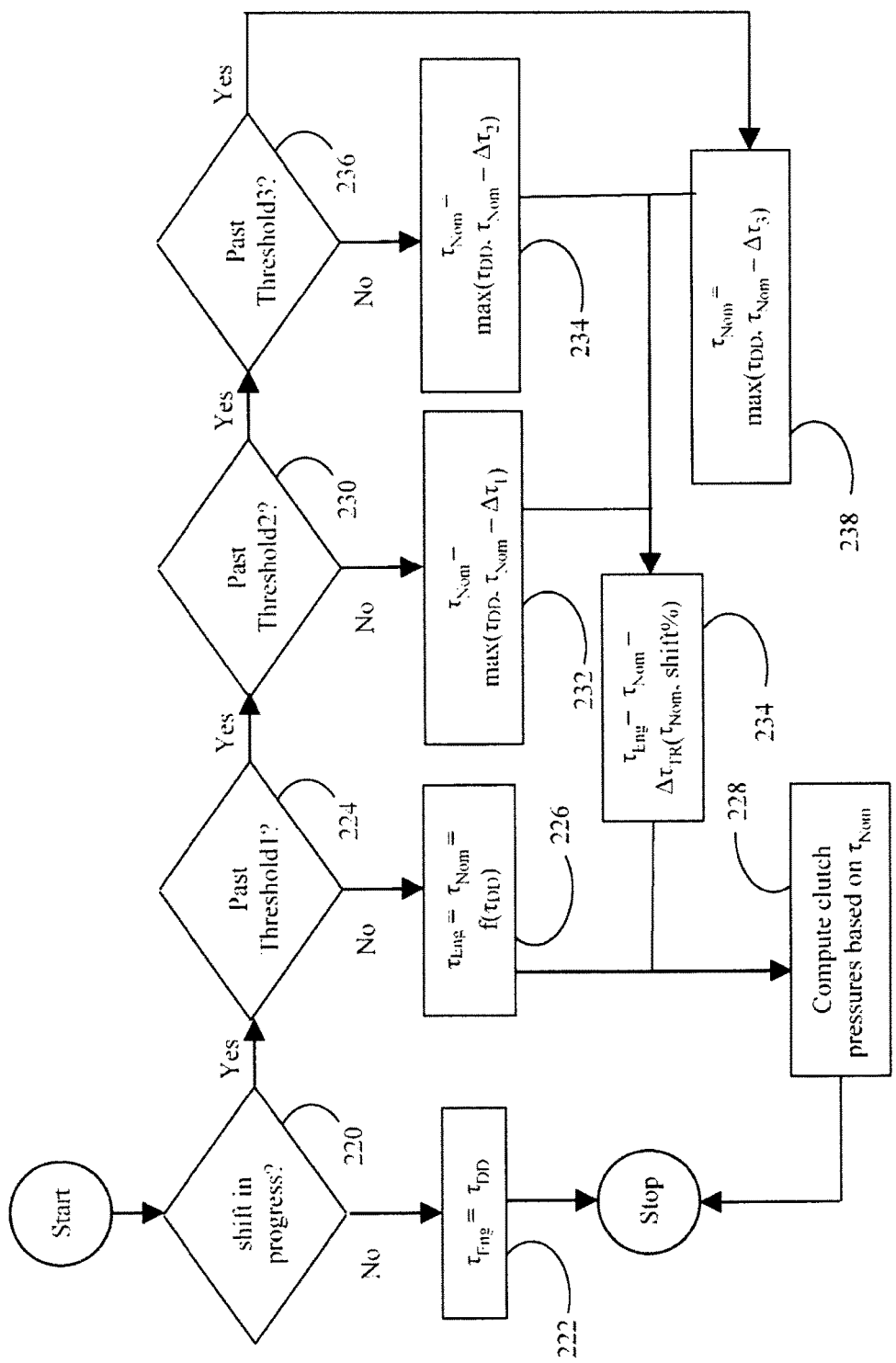
FIG. 4 is a flowchart for a method of limiting the change in input torque during an upshift.

FIG. 4 is a flow chart for an algorithm to avoid excessive torque reductions during critical phases of an upshift. This algorithm is executed at regular intervals, such as in response to an interrupt that occurs every 10 ms. At 220, the controller checks to see if any shift is in progress. If not, then no special limits on engine torque are required to prevent poor shift quality. The controller sets the nominal engine torque equal to the driver demanded torque at 222. The driver demanded torque is determined predominantly from the position of the accelerator pedal position.

At 224, the controller checks to see if the shift progress has progressed past a first threshold. This first threshold may be, for example, slightly before the beginning of the torque transfer phase. Prior to this point late in the preparatory phase, the inventors have found that rapid reductions of engine torque may be safely executed without unacceptable degradation of shift quality. If the shift has not yet reached this point at 224, the controller sets both the nominal and the actual engine torque to a function of driver demand at 226. The function may, for example, ensure that the nominal and actual engine torque remains slightly positive when the driver demand becomes negative. For moderate reductions in torque demand, the actual engine torque and nominal engine torque are set substantially equal to the driver demand. The controller then calculates the clutch pressures based on this torque quantity at 228.

If the shift has progressed past this first threshold at 224, the controller checks at 230 whether the shift has progressed past a second threshold, such as 20% completion of the inertia phase. The inventors have found that, between the late portion of the preparatory phase and the early portion of the inertia phase, rapid reductions of engine torque are particularly problematic. Therefore, the algorithm ensures at most a very slow reduction. If the shift is in this stage at 230 and the driver demand has decreased, then the new nominal engine torque is computed at 232 by decrementing the present nominal engine torque by a predetermined constant $\Delta\tau_1$ that is selected as a relatively small value such that the nominal engine torque decreases slowly. If the driver demand has increased, the new nominal engine torque will be set to the driver demand but would be allowed to decrease only very slowly from this increased level. At 234, the actual engine torque is set to the nominal torque minus any torque reduction. The torque reduction is based on shift progress and on the nominal engine torque. The nominal engine torque is used to compute clutch pressures at 228.

If the shift has progressed past this second threshold at 230, the controller checks at 236 whether the shift has progressed past a third threshold, such as 80% completion of the inertia phase. The inventors have found that, in the middle of the inertia phase, rapid reductions of engine torque are still problematic, but not as severe as in the previous stage. Therefore, the algorithm ensures at most a moderate reduction rate. If the shift is in this stage at 236, the algorithm computes the nominal engine torque at 238 using a similar formula to that at 232. However, a somewhat larger predetermined constant $\Delta\tau_2$ is used such that the input torque may decreases slightly more rapidly. Any torque reduction is applied to the actual engine torque at 234, but the clutch pressures are based on this nominal torque at 228.

If the shift has progressed to the last portion of the inertia phase, as determined at 236, a third predetermined constant $\Delta\tau_3$ is used at 238. The inventors have found that, at the late stages of the inertia phase, rapid reductions of engine torque are less problematic. In this stage, faster adjustment is allowed to prevent an excessively long delay which a driver may consider a responsiveness issue.

Figure 5:
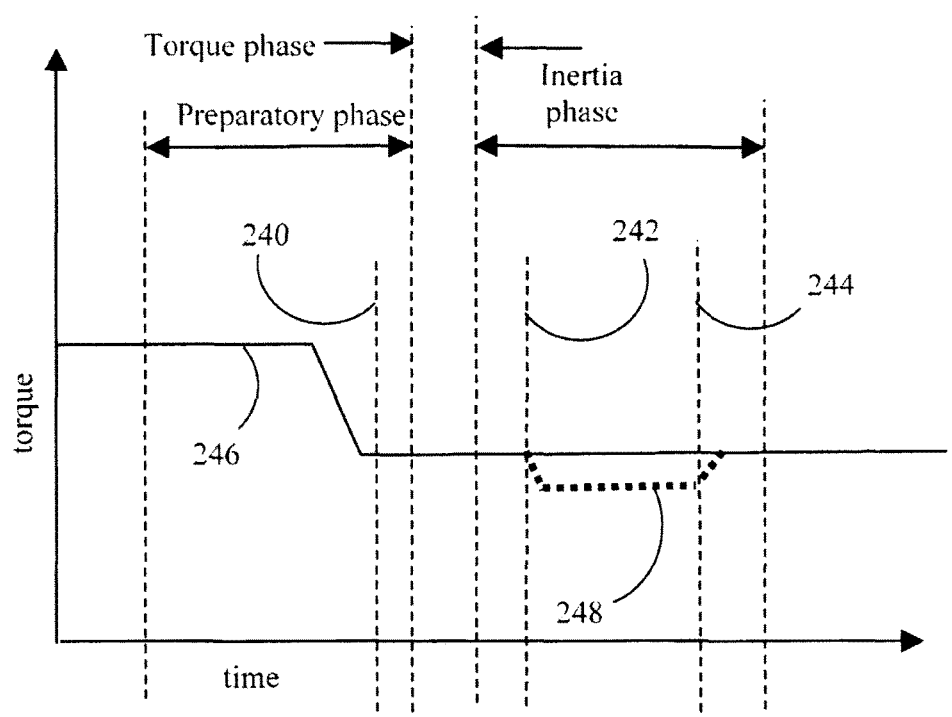
FIG. 5 is a graph illustrating an upshift with a reduction in driver demanded torque early in the shift according to the algorithm of FIG. 4.

FIG. 5 is a graph illustrating the results of applying the algorithm of FIG. 4 when a driver partially releases the accelerator pedal during the preparatory phase. The first, second, and third thresholds are indicated by vertical dashed lines 240, 242, and 244 respectively. Solid line 246 indicates the driver demanded torque and also the nominal engine torque, which are equal throughout the shift in this scenario. Dotted line 248 indicates the actual engine torque during the inertia phase torque reduction. At other points in time, the actual engine torque is equal to the driver demand and nominal engine torque. In FIG. 5, the second threshold coincides with the beginning of torque reduction and the third threshold coincides with the beginning of the phase-out of torque reduction. This would not necessarily be the case in all embodiments.

Figure 6:
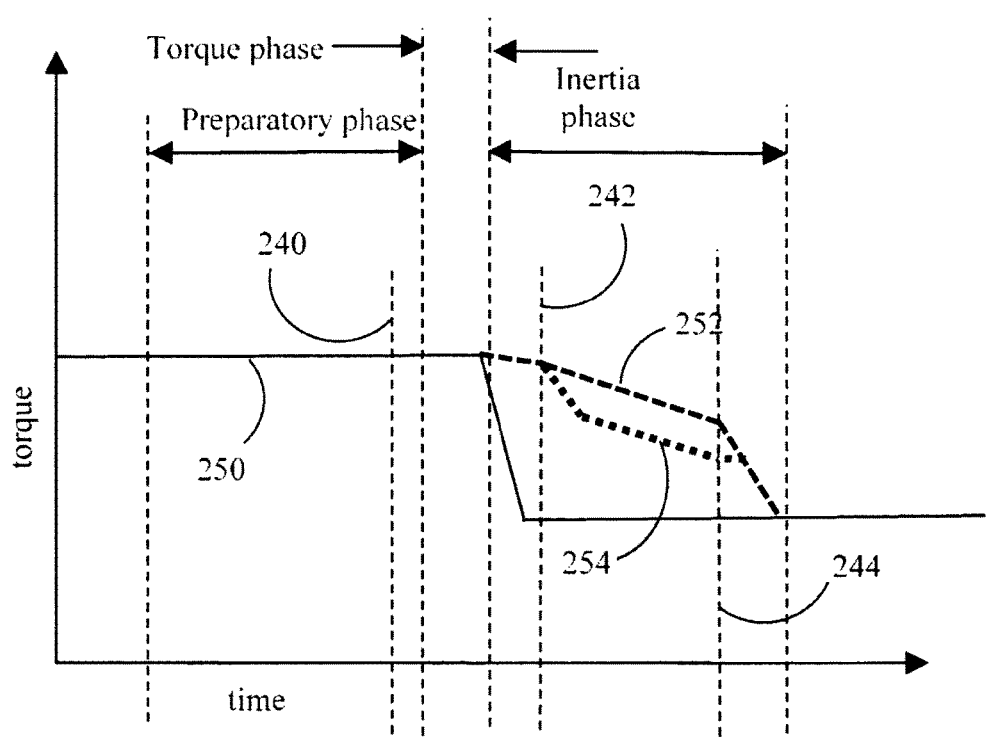
FIG. 6 is a graph illustrating an upshift with a reduction in driver demanded torque later in the shift according to the algorithm of FIG. 4.

FIG. 6 is a graph illustrating the results of applying the algorithm of FIG. 4 when a driver partially releases the accelerator pedal late in the torque. Solid line 250 indicates the driver demanded torque. Dashed line 252 indicates the nominal engine torque when it differs from the driver demand. Dotted line 254 indicates the actual engine torque during the inertia phase torque reduction. Note that the nominal engine torque is maintained substantially higher than the driver demanded torque through much of the inertia phase of the upshift. The nominal engine torque (and the actual engine torque) decreases very slowly between the time of the pedal release and the second threshold. The rate of change increases between the second and third thresholds and increases again after the third threshold.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A powertrain comprising:
   an engine;
   a transmission having a plurality of clutches engageable in various combinations to establish varying power flow paths; and
   a controller programmed to
      maintain an engine torque greater than a driver demanded torque in response to a reduction in driver demanded torque during a torque phase of a shift of the transmission, and
      reduce the engine torque at a first rate during a remainder of the torque phase and an initial portion of an inertia phase and then reduce the engine torque at a second rate faster than the first rate during a second portion of the inertia phase.

2. The powertrain of claim 1 wherein the controller is further programmed to reduce the engine torque at a third rate faster than the second rate during a final portion of the inertia phase.

3. The powertrain of claim 1 wherein the controller is further programmed to immediately reduce the engine torque during a preparatory phase of the shift in response to a reduction in driver demanded torque during the preparatory phase of a shift.

4. A powertrain comprising:
   an engine;
   a transmission having a plurality of clutches engageable in various combinations to establish varying power flow paths; and
   a controller programmed to
      maintain a nominal torque level above a driver demanded torque in response to a reduction in the driver demanded torque during a torque phase of a shift,
      command the engine to deliver a torque equal to the nominal torque level during the phase, and
      command clutch apply pressures based on the nominal torque level throughout the shift.

5. The powertrain of claim 4 wherein the controller is further programmed to reduce the nominal torque level at a first rate during a remainder of the torque phase and an initial portion of an inertia phase and then reduce the nominal torque level at a second rate faster than the first rate during a second portion of the inertia phase.

6. The powertrain of claim 5 wherein the controller is further programmed to reduce the nominal torque level at a third rate faster than the second rate during a final portion of the inertia phase.

7. The powertrain of claim 5 wherein the controller is further programmed to command the engine to deliver a torque less than the nominal torque level during a portion of the inertia phase.

8. The powertrain of claim 7 wherein the controller is further programmed to command the engine to deliver a torque equal to the nominal torque level during a remainder of the inertia phase.

9. A method comprising:
   during a torque phase of a shift, releasing an off-going shift element and partially engaging an oncoming shift element;
   during an inertia phase of the shift, controlling a torque capacity of the oncoming shift element at a level greater than required to transmit an input torque to eliminate slip across the oncoming shift element;
   in response to a reduction in a driver demanded torque during the torque phase, commanding an engine to deliver a nominal torque exceeding the driver demanded torque through a remainder of the torque phase; and
   commanding clutch apply pressure based on the nominal torque level throughout the shift.

10. The method of claim 9 further comprising:
    reducing the nominal torque level at a first rate during a remainder of the torque phase and an initial portion of the inertia phase;
    reducing the nominal torque level at a second rate faster than the first rate during a second portion of the inertia phase; and
    commanding the engine to deliver torque equal to the nominal torque level through the remainder of the torque phase.

11. The method of claim 10 further comprising reducing the nominal torque level at a third rate faster than the second rate during a final portion of the inertia phase.

12. The method of claim 10 further comprising command the engine to deliver torque less than the nominal torque level during a portion of the inertia phase.

13. The method of claim 12 further comprising commanding the engine to deliver torque equal to the nominal torque level during a remainder of the inertia phase.

* * * * *